United States Patent
Schelhas et al.

[11] Patent Number: 6,047,685
[45] Date of Patent: Apr. 11, 2000

[54] FEEDING DEVICE FOR FUEL

[75] Inventors: Peter Schelhas, Stuttgart; Kurt Frank, Schorndorf; Michael Kuehn, Bietigheim-Bissingen; Willi Strohl, Beilstein; Albert Gerhard, Tamm, all of Germany

[73] Assignee: Robert Bosch GmbH, Stuttgart, Germany

[21] Appl. No.: 09/397,246

[22] Filed: Sep. 16, 1999

[30]    Foreign Application Priority Data

Sep. 19, 1998 [DE] Germany ............................ 198 43 019

[51] Int. Cl.⁷ .................................................. F02M 37/04
[52] U.S. Cl. ........................................... 123/510; 123/514
[58] Field of Search .................................... 123/509, 510, 123/514, 516, 468, 469; 417/423.14

[56]              References Cited

U.S. PATENT DOCUMENTS

| | | | |
|---|---|---|---|
| 3,227,147 | 1/1966 | Gossiaux | 123/468 |
| 4,845,393 | 7/1989 | Burgess | 123/497 |
| 5,170,764 | 12/1992 | Tuckey . | |
| 5,195,494 | 3/1993 | Tuckey | 123/510 |
| 5,338,163 | 8/1994 | Frank | 123/497 |
| 5,520,156 | 5/1996 | Brunnhofer | 123/510 |
| 5,740,784 | 4/1998 | McKinney | 123/510 |
| 5,782,223 | 7/1998 | Yamashita | 123/510 |
| 5,785,032 | 7/1998 | Yamashita | 123/510 |

FOREIGN PATENT DOCUMENTS

| | | |
|---|---|---|
| 0 707 542 B1 | 8/1998 | European Pat. Off. . |
| 44 44 854 A1 | 6/1996 | Germany . |
| 406280712 | 10/1994 | Japan ..................................... 123/468 |

*Primary Examiner*—Carl S. Miller
*Attorney, Agent, or Firm*—Michael J. Striker

[57]            ABSTRACT

A feeding device for fuel having an electric motor, a feed pump which is driven by the electric motor, a filter arranged in a fuel stream of the feed pump, a housing accommodating the electric motor, the feed pump and the filter, a fuel tank for a fuel supply and provided with a tank flange which forms a cover, tubular connections for guiding a fuel stream in a feeding direction and to the tank flange, the tubular connections being composed of an electrically conductive plastic and producing a throughgoing electrical ground connection of all components through which a fuel flows.

6 Claims, 1 Drawing Sheet

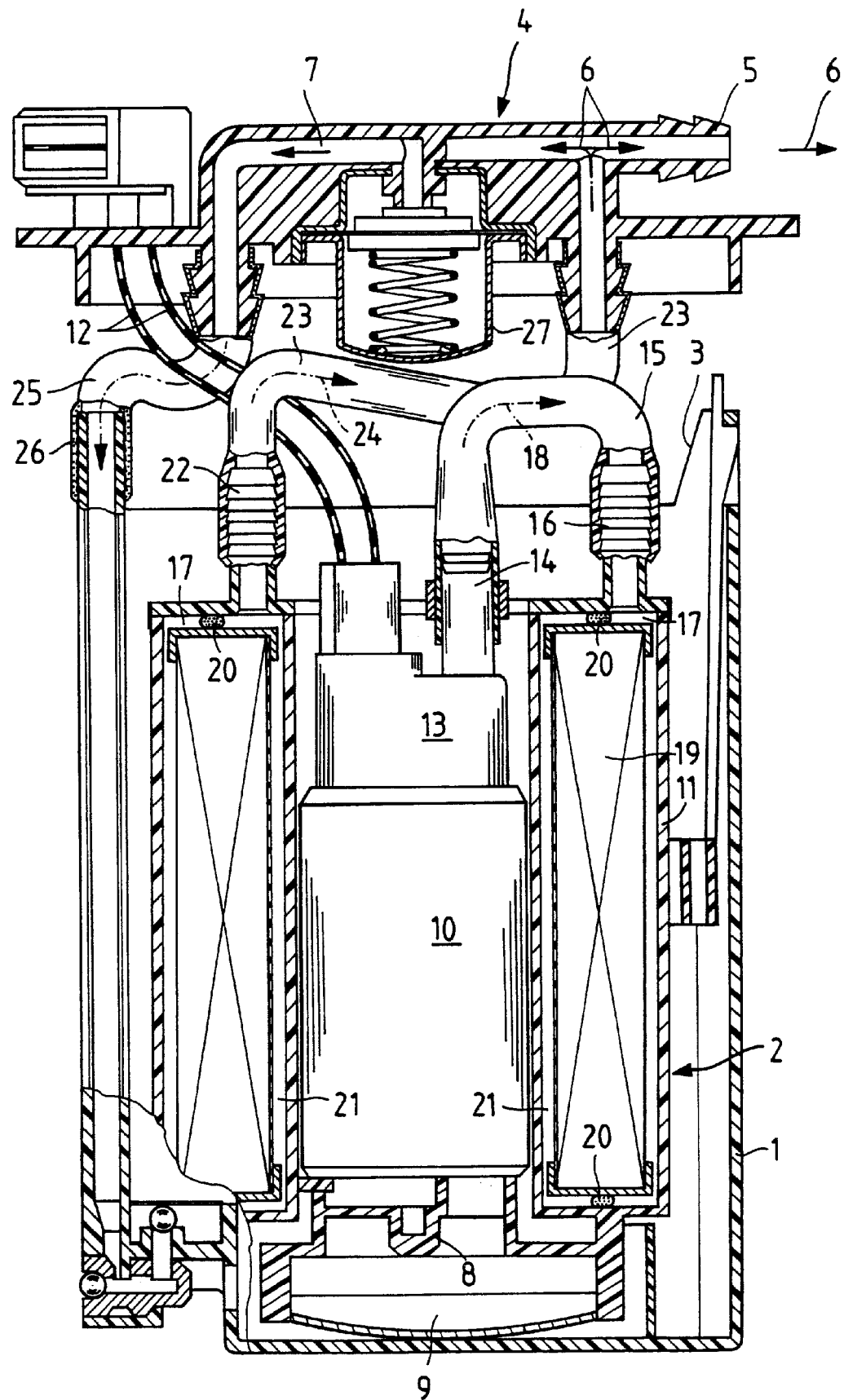

FEEDING DEVICE FOR FUEL

BACKGROUND OF THE INVENTION

The present invention relates to a feeding device for feeding fuel.

Feeding devices of the above mentioned general type are known in the art. In known feeding devices the fuel is fed from a fuel tank, for example to an injection system of an internal combustion engine of a motor vehicle. Such a feeding device is disclosed for example in the German patent document DE 44 44 854 A1. In this device the feed pump is driven by an electric motor and the fuel flows from the feed pump through a pre-filter and then is supplied after the feed pump under the feed pressure through a main filter. These components are arranged in a filter casing with a removable cover. The electric motor and the feed pump are located in a central chamber, and the main filter is located in a ring chamber which is arranged concentrically to the main chamber.

Communications for tubular connections or pressure hoses are provided on the cover of the filter cup. The fuel is supplied through them to a connection flange on the fuel tank. The feeding device thereby forms a complete feeding module which can be arranged directly in the fuel tank. The fuel in the fuel tank can be aspirated from below on the feeding module and from above from the connecting flange on the cover of the fuel tank and supplied through a supply conduit to the internal combustion engine.

With such an arrangement, it is important that no electrical discharge can take place, which can lead to an ignition of fuel or the fuel-air mixture in the tank. The corresponding withdrawn of electrostatic charges is difficult to execute with the components which are mainly composed of synthetic plastic and either are non electrically conductive or have poor electrical conductivity.

SUMMARY OF THE INVENTION

Accordingly, it is an object of the present invention to provide a feeding device of the above mentioned general type, which avoids the disadvantages of the prior art.

In keeping with these objects and with others which will become apparent hereinafter, one feature of present invention resides, briefly stated, in a feeding device for fuel in which the tubular connections are composed of an electrically conductive plastic, and through the tubular connection a throughgoing electrical ground connection is provided for all components through which the fuel flows.

When the feeding device is designed in accordance with the present invention, then in a simple manner all static charges can be withdrawn by forming the tubular connections of an electrically conductive plastic and executing a throughgoing electrical ground connection of all components for fuel passage through the tubular connection. Thereby in an advantageous manner the ground connection or a simultaneous electrical potential is established, for example through a conductive tank cover, a conductive feed cover or another part arranged in a feeding path of the fuel of a motor vehicle. When the connection points of the tubular connections are conductive or have conductive regions, then in accordance with the present invention the feeding device for fuel can be produced without additional components with price-favorable construction. A withdrawn of the electrical charge is performed directly at the corresponding discharge point, which is located as a rule in the regions through which fuel flows.

The conductive plastic can be for example polyoxymethylene, polyformaldhyde or polyamide provided with metal, conductive soot, or carbon fibers.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The single FIGURE of the drawings is a view showing a section of a feeding device for fuel in accordance with present invention, which is pre-mounted in a fuel tank.

DESCRIPTION OF PREFERRED EMBODIMENTS

The drawing shows a longitudinal section of a fuel tank 1 with a feeding module or a feeding device 2, which can be inserted from above from an opening 3 of the fuel tank 1. The opening 3 is closeable with a tank flange 4. A connecting pipe 5 for a not shown supply conduit is located on the tank flange. It leads to an internal combustion engine of a motor vehicle and transports the fuel in direction of the arrow 6. Furthermore, the tank flange 4 is provided with a connection for a fuel return conduit 7 which comes from the internal combustion engine and for a pressure regulator 27 whose operation is not important for the understanding of the present invention.

The feeding device 2 in its lower region has a feed pump 8. The feed pump aspirates the fuel from the bottom region of the fuel tank 1 through a pre-filter 9. The feed pump is driven by an electric motor 10, which is located above the feed pump 8 centrally in a filter casing 11 as a housing. The electric motor 10 is supplied through connecting conductors 12 with an electrical voltage and controlled through them. The cover 13 of the electric motor 10 is composed of an electrically conductive material.

A tubular connection 15 is connected to a connecting pipe 14 of the electric motor 4 which is composed of an electrically conductive material. The tubular connection 15 is also composed of an electrically conductive plastic material. Through the tubular connection 15, the fed fuel flows through a connecting pipe 16 and to an inner chamber 17 of the filter casing 11 in direction of the arrow 15. A main filter element 19 is arranged in the filter casing 11 concentrically around the central chamber with the electric motor 10. It is subdivided through ring seals 20 of the filter cup 11 into the outer chamber 17 and the inner chamber 21. The filtered fuel flows from the inner chamber 21 through the throughgoing main filter element 19, to a connection pipe 22.

A tubular connection 23 composed of an electrically conductive material is connected to the connection pipe 22. It produces a connection to the tank flange 4, so that the fuel can flow in accordance with the arrows 24 and 6 from the inner chamber 21 of the filter casing 11 to the outer supply conduit. The fuel return conduit 7 is also connected through a tubular connection 25 composed of an electrically conductive plastic, to a connection pipe 26 of the fuel tank 1. The connection pipe 16 and 22 are mounted on the same component, and therefore an electrically conductive connection is produced through them.

With the inventive arrangement of the electrically conductive tubular connection 15, 23, and 26 as well as the electrically conductive cover 13 of the electric motor 10 and the tank flange 4, as a rule of metal, a uniform electrical potential is provided in the whole flow path of the fuel in the feeding device 2 and in the fuel tank 1. Since the fuel tank 1 or the tank flange 4 as a rule is connected with the electrical mass or ground of the vehicle which is driven by the internal combustion engine, an electrical ground contact of the tubular connection 15, 23 and 25 as well as the other conductive parts is guaranteed. Therefore, no disturbing discharge processes can occur.

It will be understood that each of the elements described above, or two or more together, may also find a useful application in other types of constructions differing from the types described above.

While the invention has been illustrated and described as embodied in feeding device for fuel, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A feeding device for fuel, comprising an electric motor; a feed pump which is driven by said electric motor; filtering means arranged in a fuel stream of said feed pump; a housing accommodating said electric motor, said feed pump and said filtering means, a fuel tank for a fuel supply and provided with a tank flange which forms a cover; tubular connections for guiding fuel stream in a feeding direction and to said tank flange, said tubular connections being composed of an electrically conductive plastic and producing a throughgoing electrical ground connection of all components through which a fuel flows.

2. A feeding device as defined in claim 1, wherein said filtering means is arranged upstream of said feed pump in a direction of the fuel stream.

3. A feeding device as defined in claim 1, wherein said filtering means is arranged downstream of said feed pump in a direction of the fuel stream.

4. A feeding device as defined in claim 1, wherein said tank flange is composed of an electrically conductive material, said ground connection being established through metal parts of a motor vehicle through said electrically conductive tank flange.

5. A feeding device as defined in claim 1, wherein said feed pump has an electrically conductive feed pump cover through which said ground connection to metal parts of a motor vehicle is established.

6. A feeding device as defined in claim 1; and further comprising an electrically conductive component arranged in a feeding path of the fuel stream and establishing said ground connection to metal parts of a motor vehicle.

* * * * *